Figure 5:
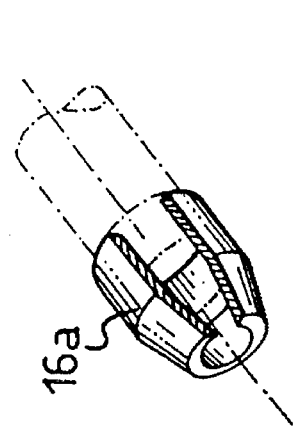

United States Patent [19]

Mozzati

[11] Patent Number: 5,668,909

[45] Date of Patent: Sep. 16, 1997

[54] CONTAINER FOR HOUSING OPTICAL COMPONENTS IN AN ACTIVE FIBER OPTICAL AMPLIFIER

[75] Inventor: Gianfranco Mozzati, Pioltello, Italy

[73] Assignee: Pirelli Cavi S.p.A., Italy

[21] Appl. No.: 567,493

[22] Filed: Dec. 5, 1995

[30] Foreign Application Priority Data

Feb. 15, 1994 [IT] Italy .................. MI94A2531

[51] Int. Cl.⁶ ................................. G02B 6/46
[52] U.S. Cl. ................. 385/134; 385/135; 385/78
[58] Field of Search .................. 385/134, 135, 385/78, 76

[56] References Cited

U.S. PATENT DOCUMENTS

| | | | |
|---|---|---|---|
| 4,266,853 | 5/1981 | Hutchins et al. | |
| 4,793,681 | 12/1988 | Barlow et al. | 385/135 |
| 5,071,211 | 12/1991 | Debortoli et al. | 385/76 |
| 5,353,367 | 10/1994 | Czosnowski et al. | 385/135 |
| 5,383,051 | 1/1995 | Delrosso et al. | 359/341 |
| 5,422,974 | 6/1995 | Brown et al. | 385/135 |
| 5,434,944 | 7/1995 | Kerry et al. | 385/135 |
| 5,515,472 | 5/1996 | Mullaney et al. | 385/135 |

FOREIGN PATENT DOCUMENTS

| | | | |
|---|---|---|---|
| 0409258A3 | 7/1990 | European Pat. Off. | H01S 3/06 |
| 0557190A1 | 2/1993 | European Pat. Off. | G02B 6/44 |
| WO8905989 | 6/1989 | WIPO | G02B 6/44 |

OTHER PUBLICATIONS

Patent Abstracts of Japan vol. 16, No. 348 (P–1393) Jul. 1992 & JP–A–04 106 505 (Fujitsu)—Abstract.

*Primary Examiner*—John D. Lee
*Assistant Examiner*—Ellen E. Kang
*Attorney, Agent, or Firm*—Brooks Haidt Haffner & Delahunty

[57] ABSTRACT

The container for housing optical components (at least one active fibre, a plurality of passive optical components, a plurality of welds and optionally other special components) within a shell of an active fibre optical amplifier comprises a first box element for reception of the passive optical components, a second box element for reception of the active fibre and a third box element for reception of the welds. The three box elements are constrained in a removable manner one against the other so as to form a monolithic container structure.

20 Claims, 3 Drawing Sheets

CONTAINER FOR HOUSING OPTICAL COMPONENTS IN AN ACTIVE FIBER OPTICAL AMPLIFIER

The present invention relates to a container for housing optical components within an active fibre optical amplifier.

An active fibre optical amplifier comprises various electrical, electro-optical and optical components. Between the optical components are at least one active fibre, one or more optical couplers and optionally optical isolators. Between the electro-optical components is at least one pumping laser and optionally one or more measuring diodes. The electrical components comprise power supply and control circuits. All the components must be located in the amplifier shell.

The electrical components are normally arranged on one or more cards together with the electro-optical components. The arrangement of the electrical circuits does not present any particular problems and is provided in a manner similar to that of any electrical equipment by means of printed circuits on said cards or by means of leads welded or soldered to special terminals on the cards.

Because of the structural constraints imposed by the optical fibres, arrangement of the optical components including active components (active fibres) and passive components (isolators, couplers) is more difficult.

Indeed, the optical fibres can be curved only to a certain minimum curvature radius without causing attenuation of the signal or even damage to the fibre structure. In addition, the connections between different fibres are made with special equipment providing an intimate connection of the ends of the two fibres by means of butt welding in such a manner as to minimise the signal attenuation caused by the connections. Each weld or splice thus created is encapsulated in a cylindrical protective shell. For the purpose of their location in the amplifier shell, this makes the welds assimilable to the passive optical components which are also generally cylindrical in shape. Lastly, each optical or electro-optical component is provided with fibre lengths for connection to the other components. Said fibre lengths (commonly termed "pigtails") have a certain length to permit repetition of welding in case of error or repositioning and the amplifier shell must therefore provide space for housing said lengths. A component without pigtail or with pigtail too short is no longer usable.

Organisation of the optical components within the shell of an active fibre optical amplifier must allow for all these requirements.

Normally there are provided housing for one or more spools of active fibre and means of partially winding the pigtail (drums or similar elements). Arrangement of the remaining components depends on arrangement of the active fibre and the pigtails. Often the various passive components and the welds are arranged in the shell in a rather disorderly manner and assembly is therefore particularly complicated. In addition, fixing the components can be uncertain as it is achieved by means of hooks and/or silicon glue.

European patent applications EP-A-0595395 and EP-A-0595396 describe active fibre optical amplifiers in which the arrangement of the components is done in such a manner as to minimise the space occupied by the amplifier to facilitate its insertion in booths or cabinets. In these amplifiers there are provided specific seats for the active and passive optical components, the electro-optical components and the welds. The seats are variously arranged in the amplifier shell.

One problem underlying the present invention is to make rational the arrangement of the optical components in the shell of an active fibre optical amplifier both to achieve stable positioning of said components and to facilitate assembly and replacement of components.

In addition, it is observed that by avoiding uncontrolled stresses on the fibres, in particular during assembly, it is possible to achieve better amplifier performance.

Consequently the present invention in a first aspect thereof relates to a container for housing optical components within a shell of an active fibre optical amplifier with said components including at least one active fibre, a plurality of passive optical components and a plurality of welds and in which the passive optical components and the welds have an elongated cylindrical form with ends from which emerge optical fibre lengths and characterised by comprising:

a first box element for reception of the passive optical components, a second box element for reception of the active fibre, and a third box element for reception of the welds, and in which the three box elements are constrained in a removable manner one to the other so as to form a monolithic container structure.

The optical components are thus housed in an orderly manner in the container. Specifically each class of optical components is housed in a specific box element of the container together with all the other components of the same class.

Advantageously in the first box element are formed seats side by side and parallel for insertion of each of the passive optical components in an insertion direction essentially, orthogonal to the axis of said component.

This arrangement allows maximum handling ease and minimum mechanical stress on the optical fibres during manufacture of the amplifier. Indeed, it is not necessary to make any axial movement of the optical components and therefore the risk of applying excessive axial traction on the fibres is completely avoided.

Preferably the first box element has four side walls two by two opposed of which two opposed walls supporting the optical elements extending in a direction X and two opposed structural connecting walls extending in a direction Y orthogonal to direction X with each of the seats for the passive optical components comprising a pair of opposed grooves formed in the supporting walls and extending in a direction Z orthogonal to the directions X and Y with slots provided on the bottom of the grooves for passage of the optical fibre lengths emerging from the passive optical components.

The seats formed in this manner are easy to access and permit housing of several equal components in the same seat one over the other if the dimensions of the components allow it.

Preferably the second box element is formed like a tray with a flat bottom and filleted side walls for reception of at least one loose active fibre loop, i.e. not wound on spool. Such a housing of the active fibre shelters the fibre from any stress due to traction caused by a shortening of the fibre due to surrounding temperature variations.

Preferably the bottom is provided with a central relief, however the loop is not wound around the central relief but is merely laid around it loosely. Said relief serves to limit the possible curve radius of the active fibre by preventing reaching an excessive curvature, e.g. following uncontrolled traction on the fibre during assembly or subsequent maintenance.

Preferably in the third box element is formed at least one bank of seats side by side and parallel for insertion of each of the welds in an insertion direction essentially orthogonal to the axis of the weld.

This arrangement, as mentioned concerning the passive optical component seats, allows maximum handling ease and minimum mechanical stress on the optical fibres during manufacture of the amplifier. Indeed it is not necessary to perform any axial movement of the optical components and hence the risk of applying to the fibres an excessive axial traction is completely avoided. In particular, as concerns the welds, transfer of the welding equipment (positioned appropriately beside the amplifier shell) to one of the seats is extremely easy and stressless for the fibres.

Preferably in the third box element are formed two banks of coplanar seats butted one on the other with offset between the seats of one bank and the seats of the other bank equal to the breadth of approximately one-half seat. Indeed, usually the length of the cylindrical bodies of the welds is significantly less than the length of the passive components and therefore this arrangement permits better space utilisation without however causing stress on the optical fibres thanks to the offset between the seats of one bank and seats of the other. The pigtail emerging from the weld in one seat of the first bank does not face a weld of the other bank but the space between a weld and the seat housing it and can therefore maintain a rectilinear run along a generatrix of said weld of the other bank.

Advantageously the first and second box elements have a similar external conformation roughly parallelepiped and in the assembly of the container the first box element is mounted on the second box element to close it. This stacking ensures maximum compactness of the entire container.

Preferably the third box element is constrained laterally to the first and/or second box element by means of a dovetail tongue and groove coupling or equivalent in such a manner as to allow mutual coupling by means of simple sliding.

Advantageously the first and third box elements are closed by a respective cover.

Advantageously there can be provided a fourth box element for reception of special optical components and constrained laterally to the first and/or second box element by means of grooved coupling on the side opposite the third box element. The coupling will be quite analogous to that of the third box element. In the fourth box element can find housing e.g. a so-called twin-core filter.

In a specific aspect the present invention relates to a container for housing of passive optical components within an active fibre optical amplifier shell in which the passive optical components have an elongated cylindrical form with ends from which emerge optical fibre lengths and characterised by comprising seats side by side and parallel for insertion of each of the passive optical components in an insertion direction essentially orthogonal to the axis of said component.

In another specific aspect the present invention relates to a container for housing of at least one active fibre within an active fibre optical amplifier shell and characterised by comprising a box element shaped like a tray with a flat bottom and filleted side walls for reception of at least one loose active fibre loop, i.e. not wound on a spool.

In a last specific aspect the present invention relates to a container for housing of welds within an active fibre optical amplifier shell in which the welds have an elongated cylindrical form with ends from which emerge optical fibre lengths and characterised by comprising at least one bank of seats side by side and parallel for insertion of each of the welds in an insertion direction essentially orthogonal to the axis of said weld.

In a different aspect the present invention relates to a method for the arrangement of components within an active fibre optical amplifier shell with said components including at least one active fibre, a plurality of passive optical components, a plurality of welds, and characterised by:

housing the passive optical components in a first box element, housing the active fibre in a second box element, housing the welds in a third box element, and constraining in a removable manner the three box elements one to the other so as to form a monolithic container structure.

Figure 6:
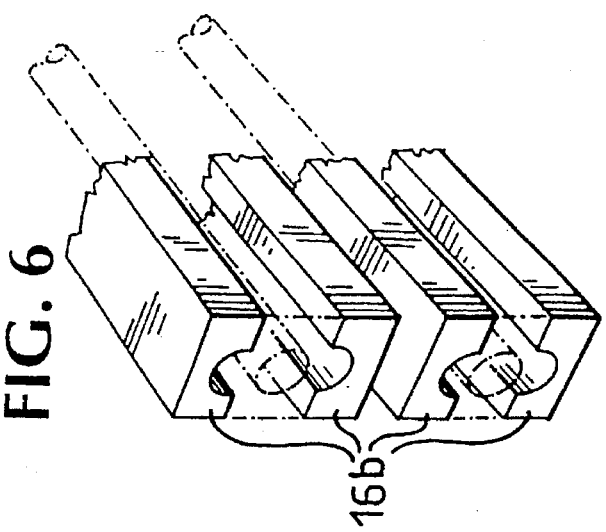
Figure 1:
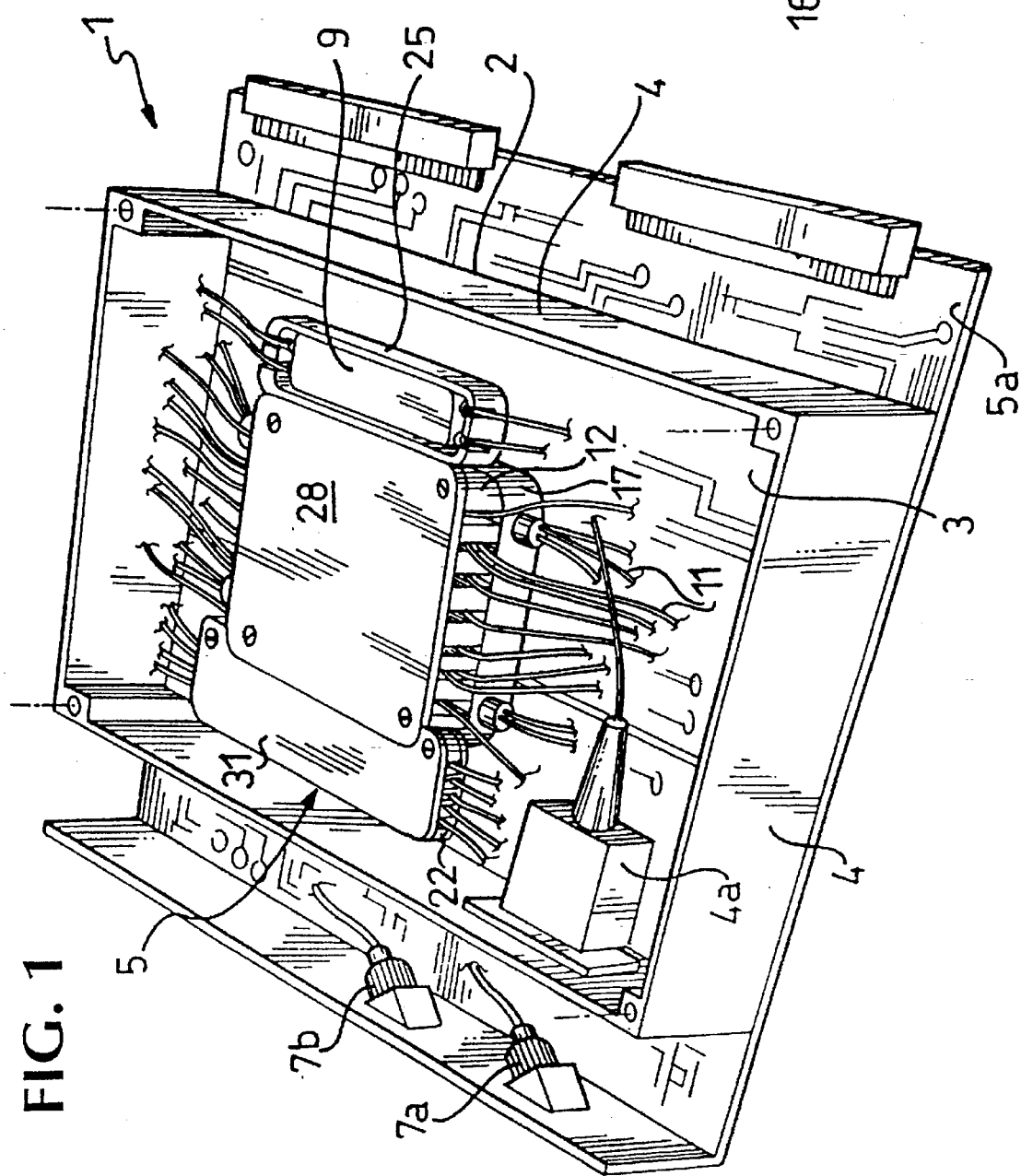
Figure 2:
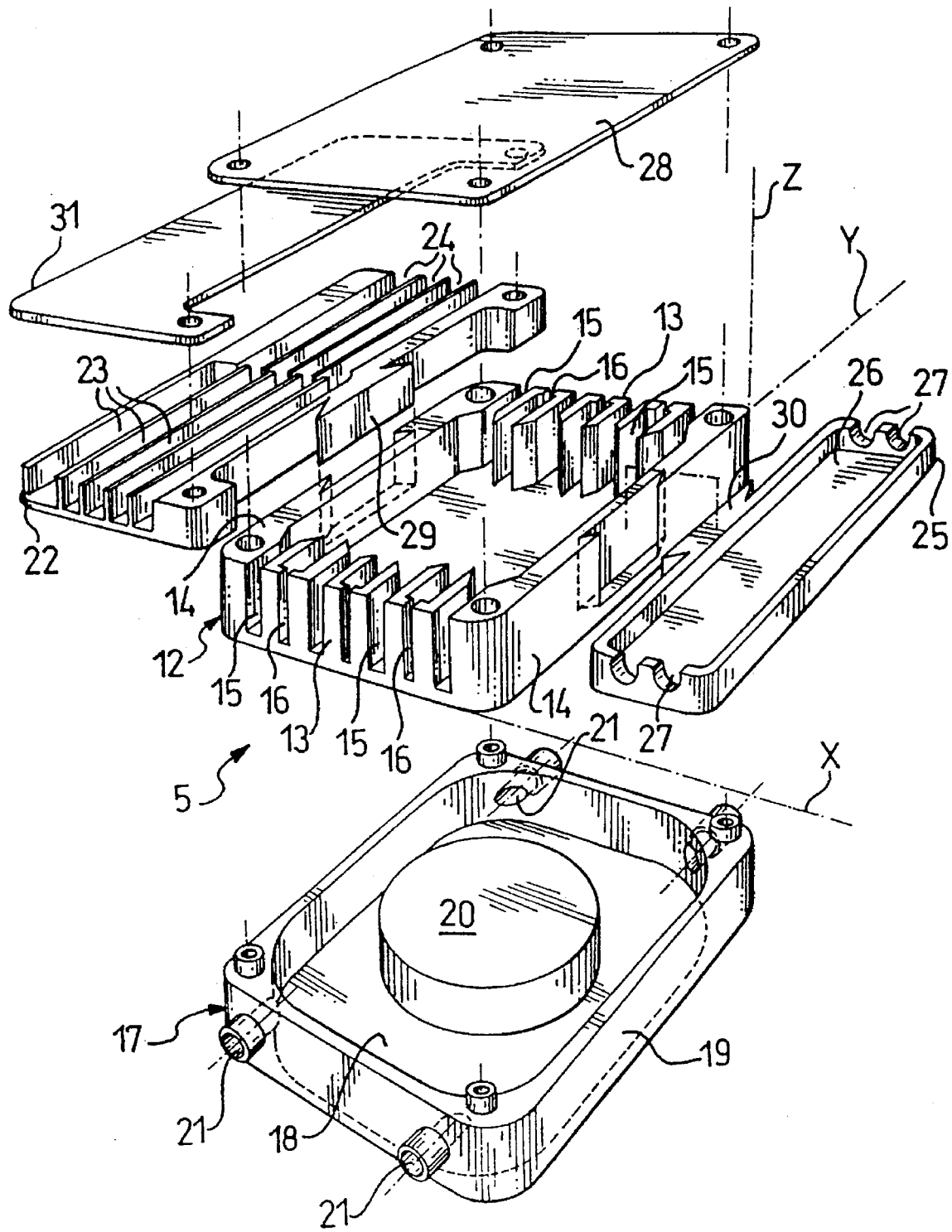
Figure 3:
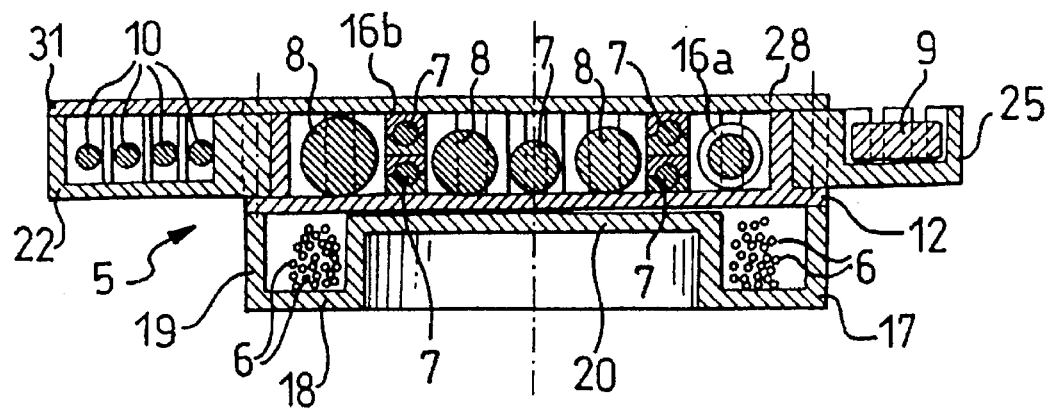
Figure 4:
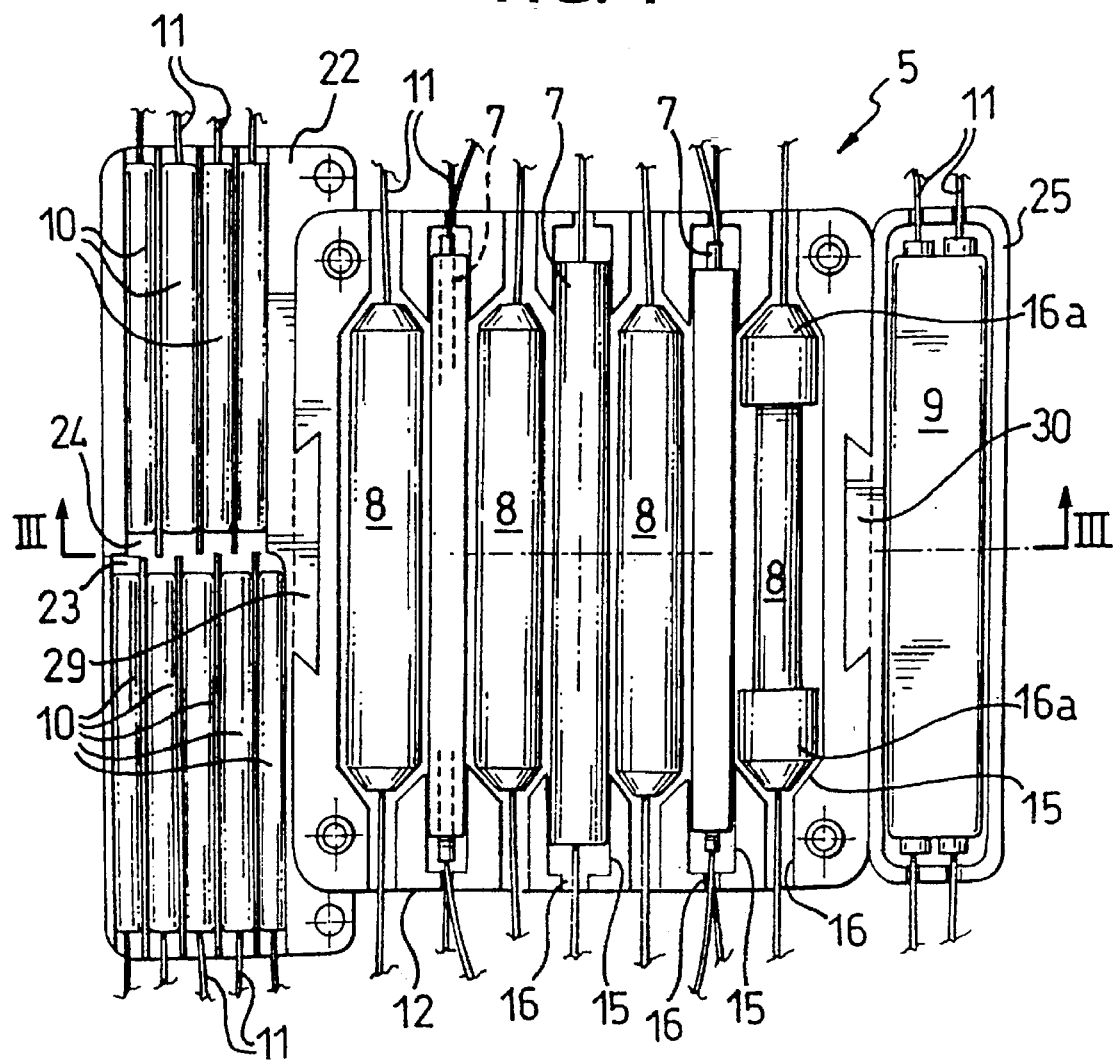

Further characteristics and advantages of the present invention are clarified by the following description of a an active fibre optical amplifier given with reference to the annexed drawings wherein:

FIG. 1 shows a schematic perspective view of an active fibre optic amplifier provided in accordance with the present invention, FIG. 2 shows an exploded perspective view of the container for optical components in the amplifier of FIG. 1, FIG. 3 shows a cross section view of the container of FIG. 2, FIG. 4 shows a plan view of the container of FIG. 2, FIG. 5 shows a partially cross sectioned perspective view of a detail of the container of FIG. 1, and FIG. 6 shows an exploded perspective view of another detail of the container of FIG. 1.

With reference to the figures, reference number 1 indicates as a whole an active fibre optical amplifier having a box shell 2 of essentially flattened parallelepiped form and with a rectangular bottom 3 and side walls 4. On the bottom 3 is placed or directly formed an electronic card incorporating or supporting electric, electronic and electro-optical components of the amplifier including the pumping lasers. For drawing simplicity however said components are shown only summarily in the FIGS. because foreign to the present invention. Specifically a pumping laser 4a is shown.

The shell 2 is mounted in turn on a card 5a incorporating additional electric components among which one or more multiconductor connectors 6a. In addition, on the card 5a are housed two optical connectors 7a and 7b for inlet to and outlet from the amplifier 1.

In the shell 2 is mounted a container 5 for housing the optical components of the amplifier 1. Said components in the example shown comprise specifically an active fibre 6, some couplers 7, some optical isolators 8, a twin-core filter 9 and some welds 10 in addition naturally to the optical fibre lengths for connection of the various components (the so-called pigtails), all indicated by 11. The elements 7 and 8 are also indicated generically as passive optical components in opposition to the fibre 6 which is active. It is noted that the number of components shown must not be considered representative of a specific optical circuit configuration. For the purposes of the present invention indeed the particular optical circuit provided with a number of optical components is irrelevant and in the FIGS. it is not sought to represent any specific optical circuit.

The container 5 comprises four box elements and two covers all provided preferably in plastic material and constrained together in a removable manner so as to form a monolithic structure.

A first box element 12 has an approximately parallelepiped form with four side walls opposed two by two and of which the two opposed walls 13 supporting the optical elements extend in a direction X and two opposed walls 14 for structural connection extend in a direction Y orthogonal to the direction X.

In the box element 12 are provided side by side parallel seats for reception of the passive optical components 7 and 8. Said seats comprise grooves 15 formed in the walls 13 in a direction Z perpendicular to the directions X and Y. The grooves 15 are open at one end (upper with reference to the FIGS.) and broken at the opposite end (lower with reference to the FIGS.). Each of the grooves 15 on each of the walls 13 is paired ideally with an equal corresponding groove 15 formed on the other of the walls 13 to form thus a seat for one or more passive components 7 and 8. The seats thus formed in the box element 12 are therefore side by side and parallel. On the bottom of each groove 15 is formed a slot 16 for passage of the pigtail 11 of the components inserted in the seat.

The shape and dimensions of the grooves 15 are determined by the shape and dimensions of the optical components to be inserted therein. Any differences, i.e. smaller components, can be compensated for with drilled elastic adapter caps 16a to be fitted on the component before insertion thereof in the grooves. The caps 16a also fulfil a useful shock absorbing function against any mechanical vibrations to protect the respective optical components. If very high shock absorption is required there can be provided specific shock absorbing blocks 16b in which the individual optical components are installed.

A second box element 17 also approximately parallelepiped in shape has the form of a tray with flat bottom 18 and side walls 19 filleted together. In the box element 17 is housed the active fibre 6 arranged not on a spool but loose in the form of a loop lying on the bottom 18 and surrounded by the walls 19. On the bottom 18 is provided a central relief 20 functioning as a guide in the arrangement of the loop of active fibre 6. The fibre 6 is not wound around the relief 20 but is only arranged around it loosely. In the side walls 19 are formed apertures 21 for passage of the active fibre 6.

A third box element 22 is also approximately parallelepiped in form and comprises a plurality of seats for welds 10 arranged in two banks, to wit a first bank of seats 23 side by side and a second bank of seats 24 side by side. The seats 23 and 24 having the same form and dimensions (with length approximately half that of the box element 22) have the form of rectilinear channels open at the ends and on one side (the upper side with reference to the FIGS.). The two banks of seats 23 and 24 are coplanar and butt against each other in an offset manner with an offset between the seats 23 and the seats 24 equal to approximately one half seat.

A fourth box element 25 also approximately parallelepiped in shape comprises a special seat 26 specifically for an optical component not housable in the seats of the box element 12. In the FIGS. is shown a flattened seat 26 for housing a twin-core filter 9 with four outlet openings 27 for the four pigtails 11 of the filter 9. The box element 25 can be omitted where there are no special optical components requiring it.

The box elements 12 and 17 have an essentially similar external form and are stackable so that the element 12 acts as a cover for the element 17. A true cover 28 closes the top of the box element 12. The mutual fixing of the box elements 12 and 17 and the cover 28 takes place by means of screws or equivalent. The box elements 22 and 25 are constrained to the element 12 by means of dovetail tongue and groove coupling indicated by 29 and 30 respectively. Another cover 31 is provided for the top closing of the box element 22 fixed thereon by means of screws or equivalent.

Assembly of the active fibre optical amplifier 1 takes place as follows.

First the active fibre 6 is housed in the box element 17 by setting it on the bottom 18 around the relief 20. The pigtails 11 of the active fibre 6 are passed outside the box element 17 through the apertures 21. If the amplifier calls for multiple active fibres 6 they can be housed in the same box element 17 (normally up to two) or in an additional identical box element superimposed on and constrained to the box element 17.

Next are inserted the passive components (couplers 7 and insolators 8) in the box element 12 superimposed on the box element 12. Each component is inserted in its seat formed by the grooves 15 by mere traversing movement in the direction indicated by Z (vertical with reference to the FIGS.), hence perpendicular to the axis of said component. There are no particular problems in this step since each component is independent and free from the others.

At this point, if not already done, there are fixed the box element 22 and optionally also the box element 25 if any and in which are housed the special optical component 9. Even these operations both of fixing of the box elements 22 and 25 and insertion of the special component 9 take place by mere traversing of the parts in direction Z.

The step usually most difficult of the assembly is performance of the welds 10 by means of a special machine, known and therefore not illustrated. For this purpose the container 5 is positioned beside the welding machine and each weld 10 performed is traversed in one of the seats 23 or 24. This movement also takes place in direction Z. Thanks to the offset between the seats 23 and 24, the pigtails 11 emerging from the welds 10 inserted in the seats 23 pass with no need of bending through the seats 24 along a generatrix of the welds 10 housed in said seats 24 and vice versa. In the housing in the respective seats the welds 10 ape traversed in direction Z and hence perpendicularly to their own axis thus eliminating the risk of the optical fibres being subjected to axial traction which could be harmful.

In making the welds 10 and arranging them in the respective seats 23 and 24 care must be taken in correctly arranging the pigtails 11 outside the container 5 within the walls 3 and 4 of the shell 2.

After completion of insertion of the various components the container 5 is closed with the covers 28 and 31.

During the life of the amplifier 1 starting from the inspection step it may be necessary to do over some imperfect or damaged weld or to replace a defective optical component. In such cases the present invention is particularly useful and not only due to the rational arrangement which makes the individual components readily identifiable.

Indeed, with the covers 28 and 31 open all the components are easily and immediately accessible. In particular they can be removed from the container 5 by a simple movement in direction Z, i.e. perpendicular to the axis of the components. Such a movement induces neither axial traction nor bending stress on the optical fibres. Replacement operations are thus much easier and safer.

I claim:

1. Container for housing optical components within an enclosure of an active fibre optical amplifier, such components including at least one active fibre, a plurality of passive optical components and a plurality of welds between optical fibres and the components and in which the passive optical components and the welds have an elongated cylindrical form with ends from which lengths of optical fibre extent and characterised by comprising:

a first box element for reception of the passive optical components, said first box element having a base and side walls for receiving said optical components between said side walls and aligning said passive optical components substantially in directions parallel to each other;

a second box element for reception of the active fibre in the form of a loop, said second box and said first box element being superimposed and being removably secured to each other; and a third box element for reception of the weld, said third box element having side walls for receiving said welds therebetween and aligning said welds substantially parallel to each other and to said passive optical components, said third box element being removably secured to one of said first box element and said second box element.

2. A container in accordance with claim 1 wherein said third box element is removably secured to a side of said first box element.

3. A container in accordance with claim 1 wherein the first box element has a pair of side walls extending transversely to said directions and spaced from each other for receiving said optical components therebetween, one of said pair of side walls having grooves extending therethrough and the other of said pair of side walls have grooves extending therethrough and aligned with the grooves of said one of said pair of side walls, said pair of side walls each having seats at said grooves for receiving the ends of said optical components and said grooves permitting said lengths of optical fibre to extend outwardly from said first box element.

4. A container in accordance with claim 3 wherein said grooves of said first box element open in the direction away from said base for insertion of said passive optical components in the direction orthogonal to the lengths of said passive optical components.

5. A container in accordance with claim 3 further comprising elastic adapter caps engaging seats and having bores for receiving ends of the passive optical components.

6. A container in accordance with claim 3 further comprising shock absorbing pads engaging said seats for engaging the ends of the passive optical components.

7. A container in accordance with claim 1 wherein said second box has a flat bottom and side walls extending perpendicularly therefrom toward said first box element for receiving said active fibre in loose form therebetween.

8. A container in accordance with claim 7 wherein said second box element has a central guide extending from said flat bottom in the same direction as and spaced from, said side walls around which said active fibre can be disposed.

9. A container in accordance with claim 1 wherein said third box element has elongate grooves extending substantially parallel to each other and to said directions for receiving said welds and aligning said welds substantially parallel to each other.

10. A container in accordance with claim 9 wherein said grooves open in a direction which permits the insertion of said welds therein in the direction orthogonal to the lengths of said welds.

11. A container in accordance with claim 9 wherein there are two sets of elongate grooves extending substantially parallel to each other, one set of grooves being offset with respect to the other set of grooves by approximately one half the width of the grooves.

12. A container in accordance with claim 1 wherein said first box element and said second box element have matching peripheries and said base of said first box element provides a cover for said second box element.

13. A container in accordance with claim 1 wherein said third box element is removably secured to said one of said first box element and said second box element by a tongue and groove coupling.

14. A container in accordance with claim 1 further comprising covers for said first box element and said third box element.

15. A container in accordance with claim 1 further comprising a fourth box element removably secured to a side of one of said first box element and said second box element by a tongue and groove coupling.

16. Method of assembling components of an active fibre amplifier in an enclosure, the components including at least one active fibre, a plurality of passive optical components and a plurality of welds between optical fibres, said method comprising:

placing the passive optical components in a first box element;

placing the active fibre in a second box element;

placing the welds in a third box element; and assembling the box elements in contiguous relation and removably securing them together to provide a monolithic unit.

17. Method according to claim 16 wherein the passive optical components are placed in parallel relation in said first box element, the welds are placed in parallel relation and in parallel relation to the passive optical components and said first box element and said second box element are superimposed.

18. Method according to claim 17 wherein said third box element is disposed at a side of one of said first box element and of said second box element.

19. Container for housing optical components within a shell of an active fibre optical amplifier with such components including at least one active fibre, a plurality of passive optical components and a plurality of welds and in which the passive optical components and the welds have an elongated cylindrical form with ends from which extend lengths of optical fibre and characterised by comprising:

a first box element for reception of the passive optical components, wherein the first box element has seats side-by-side and parallel for insertion of each of the passive optical components in an insertion direction essentially orthogonal to the axis of said component wherein the first box element has four side walls opposed two-by-two and two opposing walls extend in a direction X and two opposing structural connecting walls extending in direction Y orthogonal to direction X, each of the seats for the passive optical components comprises a pair of opposing grooves formed in the supporting walls and extending in direction Z orthogonal to the directions X and Y, slots being provided in the bottom of the grooves for passage of the optical fibre lengths extending from the passive optical components and wherein drilled elastic adapter caps are provided between the passive optical components and the respective seats for receiving the ends of the passive optical components;

a second box element for reception of the active fibre; and a third box element for reception of the welds and in which the three box elements are constrained in a removable manner to one another so as to form a monolithic structure of the container.

20. Container for housing optical components within a shell of an active fibre optical amplifier with such components including at least one active fibre, a plurality of passive optical components and a plurality of welds and in which the passive optical components and the welds have an elongated cylindrical form with ends from which extend lengths of optical fibre, comprising:

a first box element for reception of the passive optical components with said ends extending from opposite ends of the box;

a second box element for reception of the active fibre with portions of active fibre at at least one end of said second box element; and a third box element for reception of the welds with the ends of the welds extending from opposite ends of said third box element, and wherein the three box elements are removably secured to one another so as to form a monolithic structure of the container when assembled; and wherein:

the first and the second box elements are superimposed with respect to each other, and the ends of the first and third box elements and said end of said second box element are oriented in the same direction, so that the lengths of optical fibre extending from the boxes are parallel to each other.

* * * * *